3,303,033
REFRACTORY PRODUCTS
Lee D. La Grange and William A. Steele, San Diego, Calif., assignors to General Dynamics Corporation, New York, N.Y., a corporation of Delaware
No Drawing. Filed July 16, 1962, Ser. No. 210,221
9 Claims. (Cl. 106—57)

The present invention generally relates to refractory materials and more particularly relates to a method of fabricating relatively thin, substantially impermeable refractory oxide products and to the products of such method.

Refractory products are becoming increasingly important for use in specialized applications, such as in the nuclear reactor art and in the production of components for electrical generating systems, for example, fuel cells such as are more particularly disclosed in copending U.S. application of the common assignee, Serial No. 205,670 filed June 27, 1962. For such purposes, it is frequently necessary that refractory oxides be capable of being readily fabricated in various dimensionally accurate shapes, including relatively thin sections and that such products have a very low gas permeability. Hot pressing techniques can be advantageously employed since they are capable of yielding dense, low permeability refractory materials in precisely dimensioned shapes. Hot pressing temperature and pressure conditions can be controlled such that product density can be adjusted, as can porosity. Utilizing conventionally prepared starting materials, theoretical density can be approached by the application of sufficient pressure and temperature but fusion or chemical interaction of the product with the die material may prevent attainment of theoretical density.

It would be desirable to be able to produce refractory oxide products having very low gas permeability and relatively high density in a simple, effective, economical manner.

There has now been discovered a simple, effective, relatively rapid method of economically fabricating refractory oxide materials into low gas permeability, dense products of many desired sizes, shapes or thicknesses, utilizing relatively low temperatures and pressures. The method involves hot pressing refractory oxides which have been treated in a particular manner to impart thereto increased compressibility so that the desired low gas permeability, high density products can be obtained without difficulty at relatively low pressures and temperatures. The present method has particular application to the preparation of zirconia products containing one or more other oxides as major components.

Accordingly, the principal object of the present invention is to simply, readily and economically provide refractory oxide products having very low gas permeability and relatively high density in desired sizes, shapes and thicknesses. It is a further object of the present invention to provide an improved simple, economical method of fabricating refractory oxide products having low gas permeability and relatively high density. It is also an object of the present invention to provide an economical method of fabricating zirconia refractory products in a relatively highly dense form which has low gas permeability.

Further objects and advantages of the present invention will be apparent from a study of the following detailed description.

The present invention includes hot pressing at relatively low temperatures and pressures selected refractory oxides which contain minor concentrations of other oxides to form low gas permeability, relatively dense products. The oxides being hot pressed are those which have been pretreated in a particular manner to increase their compressibility. More particularly, the hot pressing method of the present invention is particularly adapted for use in the fabrication of zirconia-containing refractory oxide products suitable for use in fuel cells such as are described in copending U.S. application Serial No. 205,670. As used in this specification, zirconia is used to denote the zirconium oxide mixture in which $ZrO_2$ is the most abundant component.

Now referring more particularly to the method of the present invention, in order to achieve the desired results it is necessary that the zirconia or other refractory oxide material to be hot pressed be placed in a special condition.

Accordingly, as the first step in the method of the present invention, a pulverized form of the refractory oxide is produced. In this connection, an aqueous or other liquid solution of a soluble heat decomposable salt of the metal of the desired oxide, for example, the nitrate, e.g., zirconyl nitrate, is dropped onto or is otherwise contacted dropwise or in other small increments with a hot smooth surface, preferably of quartz or the like. The solvent evaporates, and the oxide precipitates or is formed by the decomposition of the salt. In the case of a water solution of zirconyl nitrate, water and nitric acid evaporate and $NO_2$ is evolved. The product is a friable mass which can be easily pulverized to a powdered form which is readily compressible to a low gas permeability, relatively dense product. The temperature of the quartz or other surface contacted must be high enough to assure rapid evaporation of the solvent and rapid decomposition of the dissolved salt. However, it has been found that such temperature should not be above about 400° C., for maximum compressibility of the oxide product. Temperatures in the range of from about 300° C. to about 400° C. have been found to be suitable, with temperatures about 400° C. preferred.

The present method has particular utility in the fabrication of solid zirconia electrolytes for fuel cells, disclosed in copending U.S. application Serial No. 205,670. Such electrolytes comprise a mixture of zirconia and a second selected oxide, either an alkaline earth oxide, such as calcia, or rare earth oxide, such as yttria. The second oxide should be in solid solution with the zirconia. The zirconia cubic crystalline structure is stabilized by the addition of the second selected oxide in lesser concentrations, as more fully described in the above indicated copending U.S. application Serial No. 205,670.

Accordingly, the second selected oxide can be introduced into the zirconia by dissolving a heat decomposable compound of the metal of the second oxide in the same water solution with the zirconyl nitrate, for example, yttrium nitrate. The nitrates in solution can be present in such ratio as to provide, for example, a mole ratio of zirconia to yttria in the oxide powder of, for example, 89:11.

In order to assure maximum compressibility of the powder at low temperatures and pressures, it has been found that not only is it necessary to carry out the previously described step of producing an oxide powder, but that it is also necessary that certain selected other oxide additives also be present in the powder so produced. In this connection, it is necessary to have present in the powder minor concentrations of two or more other oxides one of which is preferably an alkali metal oxide, and another of which is preferably an oxide of silicon, titanium, boron, or germanium. Examples of suitable pairs of oxides include sodium oxide and silica and sodium oxide and titania. These oxides, generally as salts, are added to the solution from which the compressible powder is produced. Concentrations of less than 1 percent, by weight of the produced powder, of each of the added oxides are suitable.

The indicated additives can be conveniently added to the described aqueous nitrate solution in the form of water-soluble salts, such as alkali metal silicates or metal nitrates, chlorides or carbonates. Upon evaporation of the solution in the described manner, the respective oxides are produced, arranged in an intimate and homogeneous mixture with the zirconium oxide and the other major oxide component. At any rate, the mixture of the minor additives should be present in solution with the previously indicated soluble salts before the solution is evaporated by dropping onto the indicated hot surface to form the desired compressible powder.

It is to be emphasized that both the addition of above indicated additives and the step of converting the salt solution to the powdered oxide in the described manner are necessary in order to produce the desired results. If either requirement is not met, subsequent hot pressing of the product does not produce, even at relatively high temperature and pressure, a finished product having the desired high density and very low gas permeability. In fact, in the absence of the required conditions, such relatively high density and low gas permeability cannot be practically provided in the product, despite the use of substantially higher temperatures and pressures in the hot pressing step.

In accordance with the present invention, the oxide powder produced as described is then hot pressed to the desired finished product having relatively high density and low gas permeability. For the hot pressing step, a suitable pressure of, for example, up to about 5000 p.s.i. can be used, preferably about 3000 p.s.i., and a sintering temperature of, for example, in the case of a zirconia-yttria mixture, of about 1350–1390° C., preferably about 1360° C., is utilized. The time required for hot pressing is only the time needed to heat the die to the desired temperature. Very little improvement in porosity is achieved by holding the product a longer time at the high temperature. Pressing pressure must be maintained during the entire heating phase, and pressure must be released before cooling is started. Conventional hot pressing equipment can be used, for example pressure rams or the like, disposed in a treating furnace controlled as to temperature. It will be noted that the temperature for hot pressing is a temperature well below the normal sintering temperature of zirconia-based ceramics.

After hot pressing the product is cooled in the die under no pressure. A sample pressed from oxide powder prepared as described will have porosity less than one volume percent. This porosity may be estimated by a water immersion and absorption method similar to the ASTM procedure C20–46, summarized as follows:

The solid sample is first weighed dry in air (D), then it is weighed suspended in water (after having been suspended in boiling water for two hours and cooled while still immersed) (S), the sample is then weighed after being wiped free of surface water (W).

The gross volume of the sample (V) equals $W-S$.

$$\text{The percent porosity} = \frac{W-D \times 100}{V}$$

The bulk density equals $D/V$.

In the case of a zirconia-yttria product, the zirconia is in crystalline form, with metal atoms (yttrium) of the lesser major component, yttria, substituted into the crystal structure of zirconia, in place of some zirconium atoms. Where the yttria is present in about 7 to about 45 mole percent concentration with respect to the total zirconia plus yttria, all of the yttria is present in solid solution in this "stabilized" cubic zirconia lattice. In the case of a zirconia-calcia product, all of the calcia is in solid solution with the cubic zirconia when the calcia is present in a concentration of about 15–25 mole percent. Calcium atoms are substituted for zirconium atoms in the zirconia crystal structure, as previously described with respect to the zirconia-yttria product. Such products have been successfully used as solid electrolytes in fuel cells, as described in the above-identified copending U.S. application. In such fuel cells, the electrolytes exhibit required high density and very low gas permeability.

Such products can be readily fabricated in the form of relatively thin plates or discs while still retaining their desired characteristics. Such discs and other forms of the products may have, for example, bulk densities, in the case of zirconia-yttria discs, of from about 5.4 to about 5.7 g./cm.$^3$, and porosity below about 1 percent.

The following examples further illustrate certain features of the present invention.

*Example I*

An aqueous solution was prepared which included zirconium as zirconyl nitrate and yttrium as yttrium nitrate, with the respective salts in a ratio in the solution to provide in the finished product 11 mol percent $Y_2O_3$ with respect to the total yttria plus zirconia.

To this aqueous solution were added the oxides of sodium and silicon in the form of sodium silicate. The amount of addition provided in the product sodium oxide, $Na_2O$ (equal to 0.8 weight percent of total zirconia and yttria) and silica, $SiO_2$ (equal to 1.8 weight percent of total zirconia and yttria). The resulting aqueous solution was then added in small increments to a partially evacuated externally heated quartz tube with the external heater maintained at a temperature slightly below 400° C. Water, nitric acid and $NO_2$ fumes which evolved during dehydration and decomposition of the salts were drawn off through a water aspirator. After the brown fumes of $NO_2$ ceased to appear, the resulting mass of mixed oxides was ball milled to a fine powder. A portion of this powder was then hot pressed in an induction heated graphite die under 3000 p.s.i. and at a temperature of about 1360° C. to form a solid disk. The disk was then cooled to ambient temperature and tested for porosity. By the previously described porosity test, the disk was found to have an immeasurably small porosity. The bulk density of the disk was found to be 5.42 g./cc. The disk was suitable for use as a solid electrolyte disk in a fuel cell, the porosity being well below the desired 1 percent maximum and the bulk density being equivalent to that desired.

*Example II*

The procedure substantially as set forth in Example I for the preparation of a zirconia-yttria electrolyte disk was carried out according to the conditions specified in Example I, except that sodium silicate and sodium bicarbonate were added in amounts sufficient to yield sodium oxide (equal to 0.7 weight percent of total zirconia plus yttria) and silica (equal to 0.3 percent of total zirconia plus yttria). The compressible powder obtained in the manner called for in Example I was hot pressed at 3000 p.s.i. and 1360° C. to yield a sample having 0.1 volume percent porosity and bulk density of 5.64 g./cc. The disc was suitable for use as a solid electrolyte in a fuel cell.

*Example III*

The procedure substantially as set forth in Example I for the preparation of a zirconia-yttria electrolyte disk was carried out according to the conditions specified in Example I, except that instead of sodium silicate, sodium bicarbonate was added in an amount sufficient to yield sodium oxide equal to 0.83 weight percent of total zirconia plus yttria, and titanium trichloride was added in an amount sufficient to yield titania equal to 0.53 weight percent of total zirconia plus yttria. The compressible powder obtained was hot pressed at 3000 p.s.i. and 1360°

C. to yield a sample having 0.8 volume percent porosity and bulk density of 5.62 grams per cubic centimeter. The disc was suitable for use as a solid electrolyte in a fuel cell.

Example IV

The procedure as set forth in Example I for the preparation of a zirconia-yttria electrolyte disk was carried out according to the conditions specified in Example I, except that instead of sodium silicate, titanium trichloride was added in an amount sufficient to yield titania equal to 1.06 percent by weight of the total zirconia plus yttria in the final product. The hot pressing was carried out at 1360° C. and 3000 p.s.i. for the same length of time and yielded a disc having a porosity of 8 percent and a bulk density of 5.26 g./cc.

Example V

The procedure called for in Example I was carried out utilizing the constituents specified in Example I except that no silica was added but instead 0.5 percent $Na_2O$ was added as $NaHCO_3$ to the aqueous solution. The product, after hot pressing in accordance with the procedure of Example I, was tested and found to have a porosity of 10.2 percent and a bulk density of 5.2 g./cc.

Example VI

The procedure called for in Example I was carried out utilizing the same constituents, except that sodium oxide was not added to the solution but only silica in a concentration of 0.8 weight percent and as ethyl orthosilicate. Upon hot pressing under the conditions called for in Example I, the product was found to have an 11.9 percent porosity and a bulk density of 4.97 g./cc.

Example VII

The procedure as set forth in Example I for the preparation of a zirconia-yttria electrolyte disk was carried out according to the conditions specified in Example I, except that no sodium silicate was added. The hot pressing was carried out at 1360° C. and at 3000 p.s.i. for the same length of time as that in Example I hot pressing. However, the product was found to have a bulk density of 4.53 g./cc. and a porosity of 20.8 percent, rendering it unsuitable for use as a solid electrolyte in a fuel cell.

Example VIII

A zirconia-yttria product was produced substantially in the manner called for in Example I, utilizing essentially the same constituents and concentrations, except that the friable mass containing the oxides of zirconium, yttrium, sodium and silicon was heated to about 800° C. for a short time before grinding to a powder. After hot pressing in accordance with the procedure of Example I, the product was found to have 7 percent porosity.

The same material, treated in an identical manner except that the oxides were heated briefly to 1500° C. instead of 800° C., was found to have, after hot pressing in accordance with the procedure of Example I, a porosity of 33 percent.

Example IX

The procedure substantially as set forth in Example I was utilized in the prepartation of a zirconia-calcia electrolyte disk, however utilizing a mol ratio in the finished product of approximately 85 parts $ZrO_2$ to 15 parts CaO. The calcia was added to the aqueous solution as calcium nitrate. Sodium oxide and silica were added as sodium silicate in the concentrations specified in Example I. Compressible powder was obtained in the manner called for in Example I, and was hot pressed at about 1375° C. and at 3000 p.s.i. for about 15 minutes to provide a suitable disk having a porosity less than 1 percent and a density approaching theoretical.

Example X

The procedure substantially as set forth in Example I, utilizing the same major constituents but with minor additives present only as impurities in the zirconyl nitrate, was carried out. The powdered oxide thus produced was found by analysis to contain silica 0.5 percent; sodium oxide, 0.1 percent; magnesium oxide, 0.2 percent and oxides of iron aluminum, copper, nickel, titanium and barium, totaling about 0.15 percent. This material, after hot pressing in accordance with the procedure of Example I, yielded a sample having 0.9 percent porosity and bulk density of 5.62 grams per cubic centimeter. The disc was suitable for use as a solid electrolyte in a fuel cell.

The preceding examples clearly establish the necessity of preparing the compressible powder utilizing two or more oxide additives as minor constituents. The examples further establish that the mixed oxides produced by solution evaporation and salt decomposition should not be subjected to temperatures much above about 400° C. Much higher temperatures, for example 800° C. and 1500° C. result in the production of powder which when compressed under comparable hot pressing conditions yields products having higher porosities and lower bulk densities.

Accordingly, a simple effective method is provided for fabricating a refractory material into low porosity, relatively high density products. Although the method is particularly directed to zirconia-containing products it is not limited thereto, but can also be utilized in the production of products containing other refractory oxide materials. Various other advantages of the present invention are set forth in the foregoing.

Various of the features of the present invention are set forth in the appended claims.

What is claimed is:

1. A method of fabricating a hot pressed, low permeability, high density zirconia refractory product, which method comprises the steps of preparing a solution containing heat decomposable soluble salts, calculated as oxides in the refractory product, of a zirconia base selected from the group consisting of a mixture of zirconium and between about 15 and about 25 mole percent calcium or a mixture of zirconium and between about 7 and about 45 mole percent yttrium, between about 0.5 and about one weight percent of an alkali metal, and between about 0.2 and about one weight percent of a metal selected from the group consisting of silicon, titanium, boron and germanium, contacting said solution with a hot surface at a temperature of not more than 400° C. to evaporate solvent from said solution and decompose said salts to the corresponding oxides whereby a friable mass is formed, powdering said mass, and thereafter hot pressing said powder at an elevated temperature and pressure for a time sufficient to provide an improved refractory oxide product having a porosity of not more than one percent measured by a method similar to ASTM procedure C20–46.

2. The method of claim 1 wherein said alkali metal is sodium and said metal is silicon.

3. The method of claim 1 wherein said alkali metal is sodium and said metal is titanium.

4. A hot pressed, low permeability, high density, zirconia base refractory product consisting essentially of a zirconia base selected from the group consisting of a solid solution of zirconia and between about 15 and about 25 mole percent calcia, and a solid solution of zirconia and between about 7 and about 45 mole percent yttria, between about 0.5 and about one percent by weight of the refractory product of an alkali metal oxide, and between about 0.2 and about one percent by weight of the refractory product of an oxide of a metal selected from the group consisting of silicon, titanium, boron and germanium, said refractory product having a porosity less than about one percent measured by a method similar to ASTM procedure C20–46.

5. A refractory product in accordance with claim 4 wherein the alkali metal oxide is sodium oxide and the metal oxide is silica.

6. A refractory product in accordance with claim 4 wherein the alkali metal oxide is sodium oxide and the oxide is titania.

7. A hot pressed, low permeability, high density, zirconia base refractory product consisting essentially of a solid solution of zirconia and between about 15 and about 25 mole percent calcia, between about 0.5 and about one percent by weight of the refractory product of an alkali metal oxide, and between about 0.2 and about one percent by weight of the refractory product of an oxide of a metal selected from the group consisting of silicon, titanium, boron and germanium, said refractory product having a porosity less than about one percent measured by a method similar to ASTM procedure C20–46.

8. A hot pressed low permeability, high density, zirconia base refractory product consisting essentially of a solid solution of zirconia and between about 7 and about 45 mole percent yttria, between about 0.5 and about one percent by weight of the refractory product of an alkali metal oxide, and between about 0.2 and about one percent by weight of the refractory product of an oxide of a metal selected from the group consisting of silicon, titanium, boron and germanium, said refractory product having a porosity less than about one percent measured by a method similar to ASTM procedure C20–46.

9. The method of claim 1 wherein said hot pressing is carried out at up to about 3000 p.s.i. and said elevated temperature is between about 1350° C. and 1400° C.

References Cited by the Examiner

UNITED STATES PATENTS 2,567,592  9/1951  Ballard _____ 106—57

FOREIGN PATENTS 120,586  11/1945  Australia.

HELEN McCARTHY, *Acting Primary Examiner.*

TOBIAS E. LEVOW, *Examiner.*

J. E. POER, *Assistant Examiner.*

UNITED STATES PATENT OFFICE
CERTIFICATE OF CORRECTION

Patent No. 3,303,033                                        February 7, 1967

Lee D. La Grange et al

It is hereby certified that error appears in the above numbered patent requiring correction and that the said Letters Patent should read as corrected below.

Column 6, line 9, for "iron" read -- iron, --; column 7, line 8, for "oxide" read -- metal oxide --.

Signed and sealed this 17th day of October 1967.

(SEAL)
Attest:

Edward M. Fletcher, Jr.                                 EDWARD J. BRENNER

Attesting Officer                                            Commissioner of Patents